US012400610B2

(12) United States Patent
Mazrouei et al.

(10) Patent No.: US 12,400,610 B2
(45) Date of Patent: Aug. 26, 2025

(54) CIRCUIT DEVICE AND DISPLAY SYSTEM

(71) Applicant: SEIKO EPSON CORPORATION, Tokyo (JP)

(72) Inventors: Sebdani Mahmood Mazrouei, Markham (CA); Kumar Anandabairavasamy Anand, Richmond (CA); Stanislav Zaozerskii, Richmond (CA); Yasutoshi Akiba, Chino (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/785,072

(22) Filed: Jul. 26, 2024

(65) Prior Publication Data

US 2025/0037674 A1 Jan. 30, 2025

(30) Foreign Application Priority Data

Jul. 28, 2023 (JP) ................................ 2023-123060

(51) Int. Cl.
*G09G 3/34* (2006.01)
*G09G 3/00* (2006.01)

(52) U.S. Cl.
CPC ........... *G09G 3/3426* (2013.01); *G09G 3/006* (2013.01); *G09G 2320/0233* (2013.01); *G09G 2320/0242* (2013.01); *G09G 2320/0646* (2013.01); *G09G 2360/16* (2013.01)

(58) Field of Classification Search
CPC .............. G09G 2320/0233; G09G 2320/0242; G09G 2320/0646; G09G 2360/144; G09G 2360/16; G09G 3/006; G09G 3/3406; G09G 3/3426
See application file for complete search history.

(56) References Cited

U.S. PATENT DOCUMENTS 8,390,656 B2 * 3/2013 Muroi .................. G09G 3/3413 345/102
9,390,660 B2 * 7/2016 Johnson ............... G09G 3/2048
(Continued)

FOREIGN PATENT DOCUMENTS

JP 2012-516458 A 7/2012

*Primary Examiner* — Kenneth Bukowski
(74) *Attorney, Agent, or Firm* — Harness, Dickey & Pierce, P.L.C.

(57) ABSTRACT

A circuit device includes a luminance analysis circuit and a dimmer circuit. The luminance analysis circuit performs luminance analysis on image data of an input image to output luminance information. The dimmer circuit determines light source luminance information indicating light-emission luminance of each of light source elements according to the luminance information. The dimmer circuit determines the light-emission luminance of the light source element from the luminance information of a pixel by using a weight corresponding to a distance between the pixel and the light source element. The dimmer circuit sets an attenuation degree of the weight with respect to the distance to a first attenuation degree when a global dimming parameter is a first value. The dimmer circuit sets the attenuation degree to a second attenuation degree higher than the first attenuation degree when the global dimming parameter is a second value smaller than the first value.

9 Claims, 13 Drawing Sheets

(56) References Cited

U.S. PATENT DOCUMENTS

| | | | | |
|---|---|---|---|---|
| 11,763,758 | B2 * | 9/2023 | Miyatani | G09G 3/3406 345/207 |
| 2009/0174638 | A1 * | 7/2009 | Brown Elliott | G09G 3/2081 345/88 |
| 2010/0238189 | A1 | 9/2010 | Feng | |
| 2010/0277514 | A1 * | 11/2010 | Yeo | G09G 3/3426 345/690 |
| 2011/0090265 | A1 * | 4/2011 | Muroi | G09G 3/3426 345/102 |
| 2011/0273495 | A1 * | 11/2011 | Ward | G09G 3/3413 345/694 |
| 2012/0120096 | A1 * | 5/2012 | Johnson | G09G 3/3426 345/596 |
| 2020/0135074 | A1 * | 4/2020 | Wooster | G09G 3/006 |
| 2020/0160813 | A1 * | 5/2020 | Aurongzeb | G09G 3/36 |
| 2021/0311361 | A1 * | 10/2021 | Okamoto | G09G 5/10 |
| 2021/0335288 | A1 * | 10/2021 | Jeon | G09G 3/3406 |
| 2022/0319402 | A1 * | 10/2022 | Furukawa | G09G 3/32 |

* cited by examiner

FIG. 5

| AMBIENT LIGHT | GLOBAL DIMMING PARAMETER | ATTENUATION DEGREE OF WEIGHT W(r) |
|---|---|---|
| BRIGHT | DIMG ≥ th | FIRST ATTENUATION DEGREE |
| DARK | DIMG < th | SECOND ATTENUATION DEGREE > FIRST ATTENUATION DEGREE |

FIG. 6

| AMBIENT LIGHT | GLOBAL DIMMING PARAMETER | ATTENUATION DEGREE OF WEIGHT W(r) |
|---|---|---|
| BRIGHT | DIMG ≥ th | HIGH-LUMINANCE MODE |
| DARK | DIMG < th | HALO REDUCTION MODE |

FIG. 7

| AMBIENT LIGHT | GLOBAL DIMMING PARAMETER | ATTENUATION DEGREE OF WEIGHT W(r) |
|---|---|---|
| BRIGHT | DIMG ≥ th1 | FIRST ATTENUATION DEGREE |
| INTERMEDIATE | th1 > DIMG ≥ th2 | THIRD ATTENUATION DEGREE > FIRST ATTENUATION DEGREE |
| DARK | DIMG < th2 | SECOND ATTENUATION DEGREE > THIRD ATTENUATION DEGREE |

FIG. 9

LUTA: $lsf^0$

LUTA1

| INDEX | $(DISTANCE)^2$ |
|---|---|
| 0 | 0 |
| 1 | 100 |
| 2 | 400 |
| 3 | 900 |
| 4 | 1600 |
| 5 | 2500 |
| 6 | 3600 |
| 7 | 4900 |
| 8 | 6400 |
| 9 | 8100 |
| 10 | 10000 |

LUTA2

| INDEX | ATTENUATION RATE |
|---|---|
| 0 | 100.0 |
| 1 | 100.0 |
| 2 | 100.0 |
| 3 | 100.0 |
| 4 | 100.0 |
| 5 | 100.0 |
| 6 | 100.0 |
| 7 | 100.0 |
| 8 | 100.0 |
| 9 | 100.0 |
| 10 | 100.0 |

FIG. 11

LUTB: $lsf^1$

LUTB1

| INDEX | $(DISTANCE)^2$ |
|---|---|
| 0 | 0 |
| 1 | 100 |
| 2 | 400 |
| 3 | 900 |
| 4 | 1600 |
| 5 | 2500 |
| 6 | 3600 |
| 7 | 4900 |
| 8 | 6400 |
| 9 | 8100 |
| 10 | 10000 |

LUTB2

| INDEX | ATTENUATION RATE |
|---|---|
| 0 | 100.0 |
| 1 | 93.9 |
| 2 | 77.9 |
| 3 | 57.0 |
| 4 | 36.8 |
| 5 | 21.0 |
| 6 | 10.5 |
| 7 | 4.7 |
| 8 | 1.8 |
| 9 | 0.6 |
| 10 | 0.2 |

FIG. 13

LUTC: $Isf^2$

LUTC1

| INDEX | $(DISTANCE)^2$ |
|---|---|
| 0 | 0 |
| 1 | 100 |
| 2 | 400 |
| 3 | 900 |
| 4 | 1600 |
| 5 | 2500 |
| 6 | 3600 |
| 7 | 4900 |
| 8 | 6400 |
| 9 | 8100 |
| 10 | 10000 |

LUTC2

| INDEX | ATTENUATION RATE |
|---|---|
| 0 | 100.0 |
| 1 | 88.2 |
| 2 | 60.7 |
| 3 | 32.5 |
| 4 | 13.5 |
| 5 | 4.4 |
| 6 | 1.1 |
| 7 | 0.2 |
| 8 | 0.0 |
| 9 | 0.0 |
| 10 | 0.0 |

CIRCUIT DEVICE AND DISPLAY SYSTEM

The present application is based on, and claims priority from JP Application Serial Number 2023-123060, filed Jul. 28, 2023, the disclosure of which is hereby incorporated by reference herein in its entirety.

BACKGROUND

1. Technical Field

The present disclosure relates to a circuit device, a display system, and the like.

2. Related Art

JP-T-2012-516458 discloses a backlight-type display that changes a drive value of an LED so as to reduce a rapid change in backlight in a dark region, whereby avoiding or reducing an artifact due to a halo effect.

By reduction of luminance of a light-emitting element that emits light to a display panel, a halo caused by the light is reduced. However, since there is a trade-off between the reduction of the halo and the decrease in luminance for illuminating the display panel, there is a possibility that dimming optimal for display contents, environments, or the like is not performed.

SUMMARY

An aspect of the present disclosure relates to a circuit device that controls a display device including light source elements and a display panel. The circuit device includes a luminance analysis circuit that performs luminance analysis on image data of an input image to output luminance information and a dimmer circuit that determines light source luminance information indicating light-emission luminance of each of the light source elements according to the luminance information. The dimmer circuit determines the light-emission luminance of the light source element from the luminance information of a pixel by using a weight corresponding to a distance between the pixel and the light source element, sets an attenuation degree of the weight with respect to the distance to a first attenuation degree when a global dimming parameter determined by a global dimming processing is a first value, and sets the attenuation degree to a second attenuation degree higher than the first attenuation degree when the global dimming parameter is a second value smaller than the first value.

Another aspect of the present disclosure relates to a display system including the circuit device described above and the display device.

BRIEF DESCRIPTION OF THE DRAWINGS

FIG. 5 is a diagram illustrating a first example of weight setting according to a global dimming parameter;

FIG. 6 is a diagram illustrating a second example of weight setting according to a global dimming parameter;

FIG. 7 is a diagram illustrating a third example of weight setting according to a global dimming parameter;

FIG. 9 is a diagram illustrating an example of a lookup table LUTA;

FIG. 11 is a diagram illustrating an example of a lookup table LUTB;

FIG. 13 is a diagram illustrating an example of a lookup table LUTC;

DESCRIPTION OF EMBODIMENTS

Hereinafter, a preferred embodiment of the present disclosure will be described in detail. It should be noted that the present embodiment described below is not intended to unduly limit the content described in the scope of claims, and all components described in the present embodiment are not necessarily essential requirements.

1. Electronic Apparatus, Display System, and Circuit Device

Figure 1:
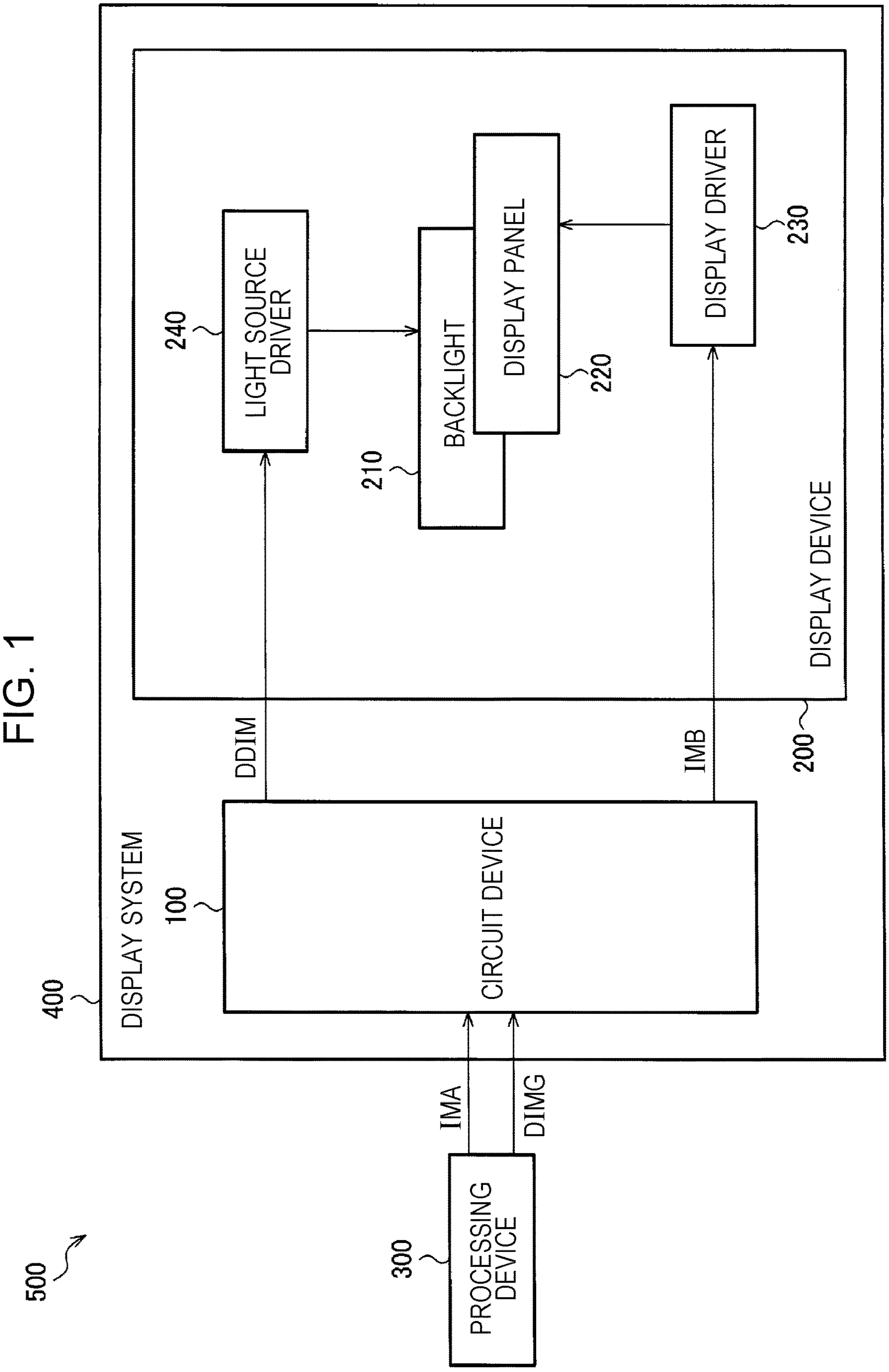
FIG. 1 is a diagram illustrating an example of a configuration of an electronic apparatus.

FIG. 1 illustrates an example of a configuration of an electronic apparatus including a display system of the present embodiment. An electronic apparatus 500 includes a processing device 300 and a display system 400. An example of the electronic apparatus 500 may be an in-vehicle display apparatus including a meter panel, a center information display, a head-up display, or an electronic mirror, a television apparatus, or an information processing apparatus including a display.

The display system 400 includes a circuit device 100 and a display device 200. The circuit device 100 is, for example, an integrated circuit device in which circuit elements are integrated on a semiconductor substrate. Although the circuit device 100 and the display device 200 are illustrated as separate components in FIG. 1, the circuit device 100 may be provided in the display device 200.

The display device 200 includes a backlight 210, a display panel 220, a display driver 230, and a light source driver 240. An example of the display device 200 is a display used for a television apparatus, an information processing apparatus, or the like. Alternatively, the display device 200 may be, for example, a head-mounted display including a projection device for eyes, or a head-up display including a projection device for a screen. When the display device 200 is a head-up display, the display device 200 further includes an optical system for projecting, onto a screen, light emitted from the backlight 210 and transmitted through the display panel 220.

In plan view of the backlight 210, light source elements are two-dimensionally arranged in the backlight 210. The light source elements are light-emitting elements that emit light by power supply, and are, for example, inorganic light-emitting diodes or organic light-emitting diodes. In local dimming control, the amounts of light of the two-dimensionally arranged light source elements are controlled independently of each other. Alternatively, the backlight 210 may be divided into areas. In plan view, light source elements are arranged in each of the areas. The light source elements arranged in an area are controlled to have the same amount of light, and the amounts of light of the respective areas are controlled independently of each other.

An example of the two-dimensional arrangement of the light source elements is a square arrangement in which the light source elements are arranged at all intersections of rows and columns. However, the two-dimensional arrangement is not limited to the square arrangement. For example, the two-dimensional arrangement may be an arrangement called, for example, a rhomboid arrangement or a zigzag arrangement. In this arrangement, the light source elements are arranged at the intersections of the odd-numbered columns and either of the odd-numbered rows or the even-numbered rows, and at the intersections of the even-numbered columns and the other of the odd-numbered rows and the even-numbered rows, and the light source elements are not arranged at the other intersections.

The light source driver 240 receives light source luminance data DDIM from the circuit device 100 and drives each of the light source elements of the backlight 210 based on the light source luminance data DDIM. The light source driver 240 is, for example, an integrated circuit device. Two or more light source drivers may be provided, and each of the light source drivers may be a separate integrated circuit device.

The display panel 220 is an electro-optical panel through which light transmitted from the backlight 210 is transmitted and which displays an image by controlling a transmittance thereof. For example, the display panel 220 is a liquid crystal display panel.

The display driver 230 receives, from the circuit device 100, image data IMB and a timing control signal for controlling a display timing. The display driver 230 drives the display panel based on the received image data IMB and timing control signal to display an image on the display panel 220.

The processing device 300 transmits image data IMA to the circuit device 100. In addition, the processing device 300 performs global dimming processing based on information regarding the amount of ambient light detected by an ambient light sensor or the like, and transmits the result to the circuit device 100 as a global dimming parameter DIMG. The processing device 300 may perform global dimming processing based on the luminance of the image represented by the image data IMA. The global dimming parameter is, for example, equal to or greater than 0 and equal to or smaller than 1, and is common to the entire backlight 210. The processing device 300 is a processor such as a CPU, a GPU, a microcomputer, a DSP, an ASIC, or an FPGA. CPU is an abbreviation for Central Processing Unit. GPU is an abbreviation for Graphics Processing Unit. DSP is an abbreviation for Digital Signal Processor. ASIC is an abbreviation for Application Specific Integrated Circuit. FPGA is an abbreviation for Field Programmable Gate Array.

The circuit device 100 receives the image data IMA and the global dimming parameter DIMG and performs local dimming control of the display device 200 based on the image data IMA and the global dimming parameter DIMG. The circuit device 100 performs dimming on light-emission luminance of each light source element of the backlight 210 or each area of the backlight 210 according to luminance of the image data IMA and outputs light source luminance information, which is obtained by the dimming, to the light source driver 240 as light source luminance data DDIM. The circuit device 100 performs, based on the light source luminance information, color correction on the image data IMA and outputs the image data IMB after the color correction to the display driver 230.

Further, the circuit device 100 incorporates a function of a display controller. In other words, the circuit device 100 transmits the image data IMB and the timing control signal for controlling the display timing to the display driver 230. Further, the circuit device 100 may perform image processing such as gradation correction, white balance correction, or scaling on the image data IMA or the image data IMB. The circuit device 100 does not necessarily incorporate the function of the display controller, and a display controller may be provided as an integrated circuit device separate from the circuit device 100. In this case, the display controller may be provided in the display device 200. The display controller and the display driver 230 may be configured by separate integrated circuit devices from each other, or may be configured by a single integrated circuit device.

2. Example of Configuration of Circuit Device

Hereinafter, illustration and description of the function of the display controller incorporated in the circuit device 100 will not be given, and illustration and description of dimming and color correction will be given.

Figure 2:
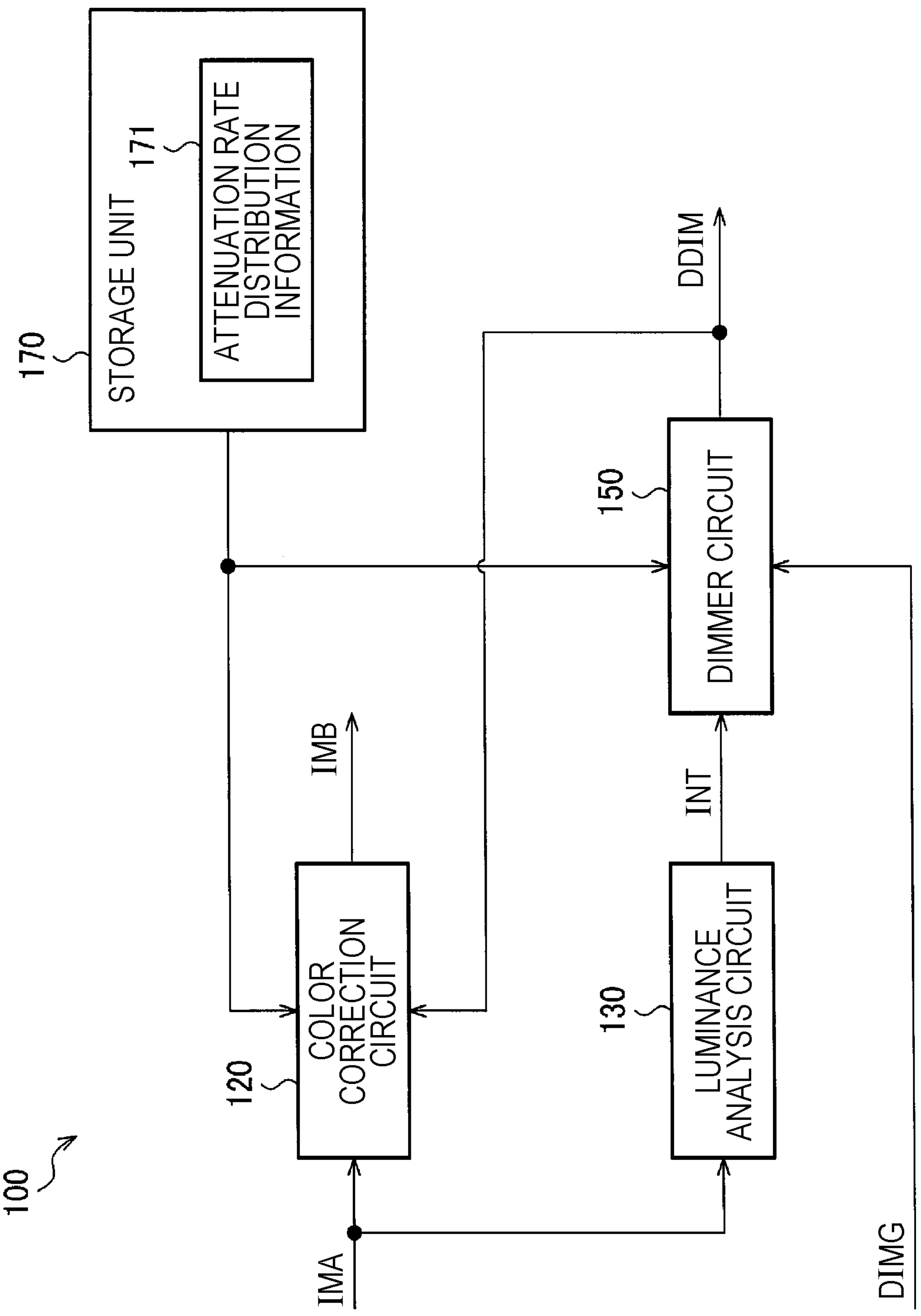
FIG. 2 is a diagram illustrating an example of a configuration of a circuit device.

FIG. 2 illustrates an example of a configuration of the circuit device. The circuit device 100 includes a color correction circuit 120, a luminance analysis circuit 130, a dimmer circuit 150, and a storage unit 170.

The storage unit 170 stores attenuation rate distribution information 171. The storage unit 170 is a register or a memory. The memory is a volatile memory such as a RAM, or a non-volatile memory such as an OTP memory or an EEPROM. RAM is an abbreviation for Random Access Memory. OTP is an abbreviation for One Time Programmable. EEPROM is an abbreviation for Electrically Erasable Programmable Read Only Memory.

The attenuation rate distribution information 171 indicates an attenuation rate distribution of light reaching the display panel from the light source element. The attenuation rate distribution indicates a relationship between a distance from the light source element to a pixel and an attenuation rate of light with which the light source element illuminates the pixel. The attenuation rate distribution is also referred to as an attenuation characteristic or a luminance distribution. The attenuation rate distribution information 171 is, for example, a lookup table or a function indicating the attenuation rate distribution. When the function is a polynomial, the attenuation rate distribution information 171 may be a coefficient of each term of the polynomial.

The circuit device 100 receives the image data IMA from the processing device 300 through an image interface (not illustrated). An image represented by the image data IMA is referred as an input image. Examples of modes of the image interface may be various modes including an LVDS, a parallel RGB mode, and a display port. LVDS is an abbreviation for Low Voltage Differential Signaling.

Figure 3:
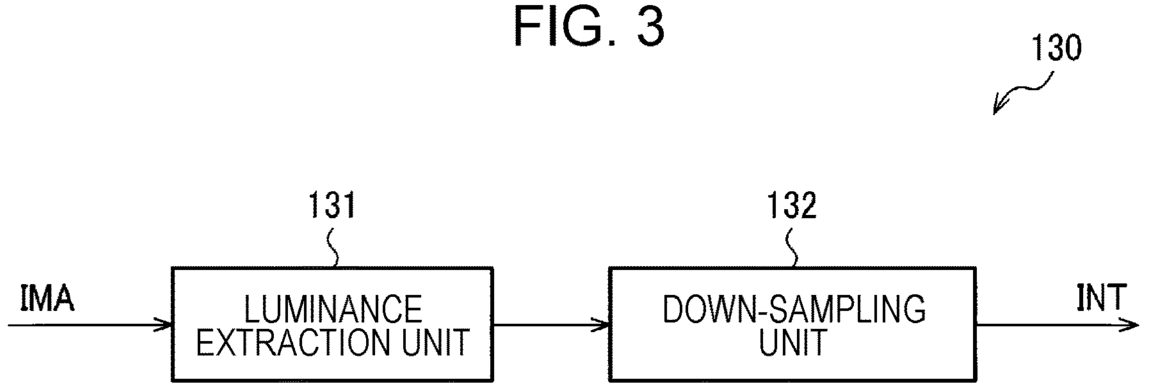
FIG. 3 is a diagram illustrating an example of a detailed configuration of a luminance analysis circuit.

The received image data IMA is input to the luminance analysis circuit 130. The luminance analysis circuit 130 analyzes the luminance of the image data IMA and outputs the obtained result as luminance information INT. The luminance information INT indicates luminance of the image at each position of the input image. FIG. 3 illustrates an example of a detailed configuration of the luminance analysis circuit. The luminance analysis circuit 130 includes a luminance extraction unit 131 and a down-sampling unit 132.

The input image is an RGB color image. In other words, each pixel of the image data IMA has an R pixel value, a G pixel value, and a B pixel value. The luminance extraction unit 131 sets the maximum value out of the R pixel value, the G pixel value, and the B pixel value as a luminance value of the corresponding pixel. Thus, a first luminance image is obtained in which each pixel has one luminance value.

The down-sampling unit 132 down-samples the first luminance image to acquire a second luminance image. The second luminance image has the number of pixels smaller than that of the first luminance image. The down-sampling may be performed in at least one of a horizontal scanning direction and a vertical scanning direction. For example, the number of pixels is down-sampled to ½ or less in both the horizontal scanning direction and the vertical scanning direction. The down-sampling unit 132 outputs the second luminance image as luminance information INT.

Note that the configuration of the luminance analysis circuit 130 is not limited to that described above. For example, the down-sampling unit 132 may be excluded, and the first luminance image may be output as luminance information INT. Alternatively, the luminance extraction unit 131 may obtain the first luminance image from a luminance value, for example, Y in a YCrCb space calculated by multiplying an RGB pixel value by a coefficient.

The dimmer circuit 150 generates light source luminance information indicating the light-emission luminance of each of the light-emitting elements, based on the luminance information INT and the global dimming parameter DIMG, and outputs the light source luminance information as light source luminance data DDIM. As described with reference to FIG. 1, the global dimming parameter DIMG is input from the processing device 300 to the circuit device 100. However, the circuit device 100 may perform the global dimming processing based on the information regarding the amount of ambient light to acquire the global dimming parameter DIMG.

Figure 4:
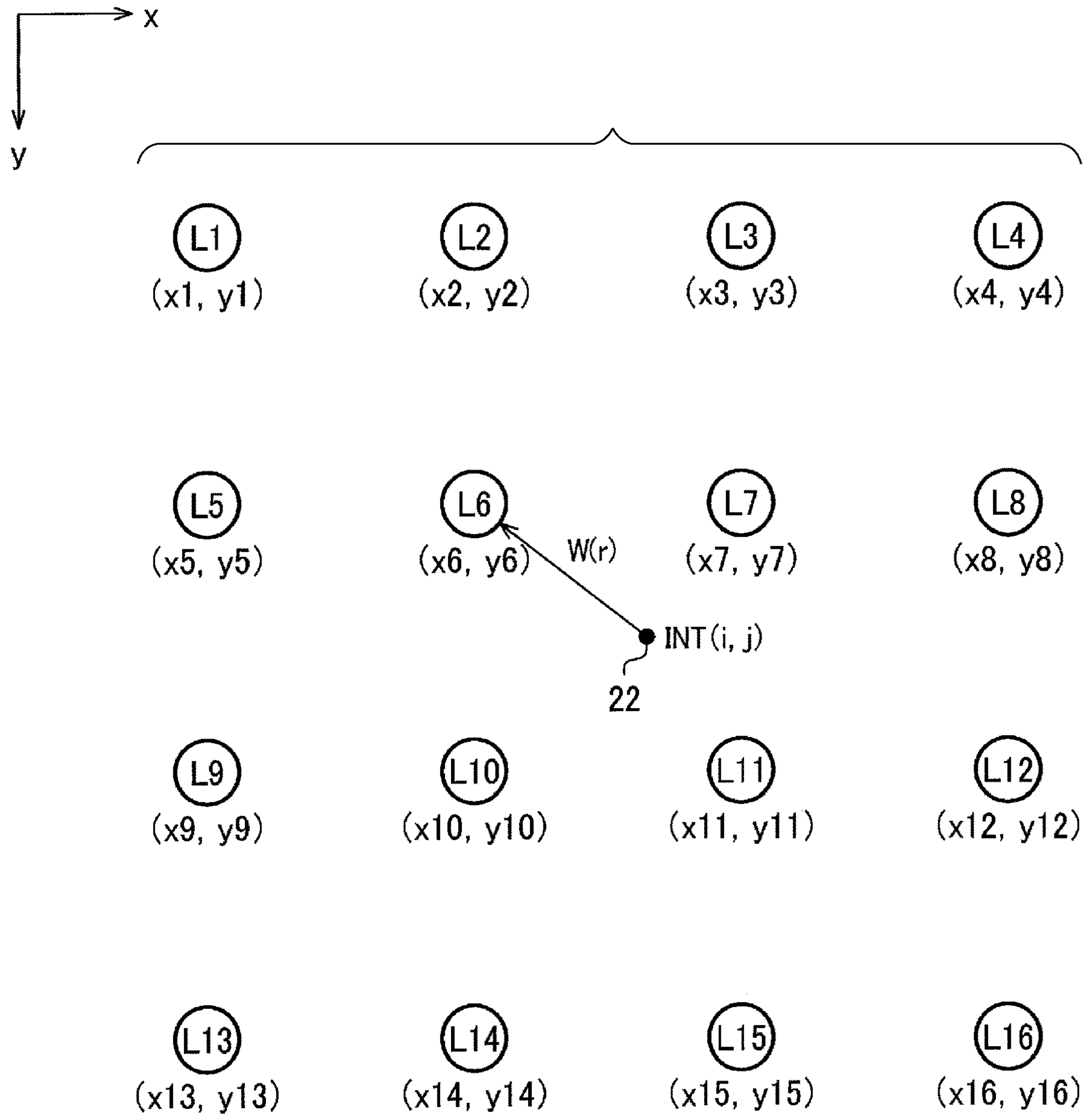
FIG. 4 is a diagram of processing performed by a dimmer circuit.

FIG. 4 illustrates a diagram of processing performed by the dimmer circuit. An x-direction is a horizontal scanning direction of the display panel, and a y-direction is a vertical scanning direction of the display panel. In the following description, it is assumed that the number of pixels of the luminance information INT is equal to the number of pixels of the display panel 220. Even when the down-sampling is performed, from the correspondence between the coordinates in the luminance information INT after down-sampling and the coordinates on the display panel 220, it is possible to consider the coordinates and distance on the display panel 220.

A target pixel 22 is any one pixel in the luminance information INT. Coordinates of such a pixel are set to (i, j). The dimmer circuit 150 determines light-emission luminance of n×m light source elements around the target pixel 22 from luminance information INT(i, j) of the target pixel 22. Each of n and m may be an integer of 2 or more, and FIG. 4 illustrates an example of n=m=4. Such 4×4 light source elements are referred to as L1 to L16. The light source element is represented by Lk, where k is an integer of 1 or more and 16 or less. The dimmer circuit 150 determines the light-emission luminance of the light source element Lk from the luminance information of the target pixel 22 by using a weight W(r) corresponding to a distance r between the target pixel 22 and the light source element Lk. When the coordinates of the light source element Lk are defined as (xk, yk), $r^2=(i-xk)^2+(j-yk)^2$, for example. FIG. 4 illustrates W(r) using k=6 as an example.

The weight W(r) becomes smaller as the distance r becomes larger. The dimmer circuit 150 changes the attenuation degree of the weight W(r) with respect to the distance r according to the global dimming parameter DIMG. Specifically, when the global dimming parameter DIMG is large, an environment is bright, or the luminance of the image represented by the image data IMA is high. In this case, the dimmer circuit 150 makes the attenuation degree of the weight W(r) with respect to the distance r low. On the other hand, when global dimming parameter DIMG is small, an environment is dark, or the luminance of the image represented by the image data IMA is low. In this case, the dimmer circuit 150 makes the attenuation degree of the weight W(r) with respect to the distance r high. The dimmer circuit 150 determines the light-emission luminance of the light source element Lk according to the luminance information INT(i, j) of the target pixel 22. The weight W(r) is weighting indicating how bright the light-emission luminance is to be made.

Regarding the weight, "the attenuation degree with respect to the distance is high" means that the distance at which the weight decreases to a predetermined value is short. The predetermined value may be any value, but is, for example, within a range of half the maximum value to zero. Alternatively, "the attenuation degree with respect to the distance is high" means that the decrease width of the weight is large with respect to a change in distance in a direction in which the distance increases. The weight may change smoothly with respect to the distance, or may change stepwise with respect to the distance.

In the local dimming, the light source elements around a high-luminance pixel emit light with high luminance. It is assumed that the target pixel 22 has high luminance. At this time, the light-emission luminance of the light source element close to the target pixel 22 is more likely to be bright, and the light-emission luminance of the light source element far from the target pixel 22 is less likely to be bright. The attenuation degree of the weight W(r) determines how far a light source element from the high-luminance target pixel 22 becomes bright. When the attenuation degree of the weight W(r) is low, not only the light source element close to the target pixel 22 but also the light source element far from the target pixel 22 is likely to be bright easily. In other words, when the environment is bright, even a light source element relatively far from the target pixel 22 emits light brightly. On the other hand, when the attenuation degree of the weight W(r) is high, the light source element Lk far from the target pixel 22 is less likely to be bright, and only the light source element Lk close to the target pixel 22 is more likely to increase in luminance. In other words, when the environment is dark, only the light source element relatively close to the target pixel 22 emits light brightly. Thus, the local dimming is appropriately performed in response to the brightness of the environment. For example, when the environment is dark, only the light source element relatively close to the high-luminance pixel emits light, thereby reducing a halo.

Various methods can be considered for changing the attenuation degree of the weight W(r). In a first method example, as will be described with reference to FIG. 8 and the subsequent drawings, the dimmer circuit 150 uses lookup tables as the attenuation rate distribution information 171, switches between the lookup tables depending on the global dimming parameter DIMG, and determines the light-emission luminance of each of the light source elements by using the lookup table and the luminance information INT. The lookup tables represent attenuation rate distributions having different degrees of attenuation from each other, and the degree of enhancement of the light-emission luminance is weighted according to the attenuation rate distribution, whereby the attenuation degree of the weight W(r) changes. In this case, as the attenuation degree of the attenuation rate distribution represented by the lookup table is lower, the luminance is distributed to the light source element far from the high-luminance pixel, and thus the attenuation degree of the weight W(r) is lower.

Alternatively, in a second method example, the dimmer circuit 150 may perform lowpass filter processing and down-sampling processing on the luminance information INT, and may use the result as the light-emission luminance of each of the light source elements. A filter matrix is used for the lowpass filter processing. The filter matrix has values of elements that attenuate from a center toward a periphery. The attenuation degree of the weight W(r) changes depending on the attenuation degree. In other words, as the attenuation degree of the filter matrix is lower, the luminance is distributed to the light source element far from the high-luminance pixel, and this the attenuation degree of the weight W(r) is lower.

The dimmer circuit 150 may perform global dimming in addition to the local dimming described above. Specifically, the dimmer circuit 150 may multiply the light-emission luminance of each of the light source elements, which are determined according to the luminance information INT, by the global dimming parameter DIMG, and may output light source luminance information indicating the light-emission luminance of each of the light source elements, which is obtained as the result, as the light source luminance data DDIM.

The color correction circuit 120 computes lighting luminance information based on the light source luminance data DDIM output from the dimmer circuit 150 and the attenuation rate distribution information 171 stored in the storage unit 170. The lighting luminance information indicates lighting luminance in each pixel of the display panel 220 when the display panel 220 is illuminated by the backlight 210. The computation of the lighting luminance will be described below in detail with reference to FIG. 16. The color correction circuit 120 performs, based on the lighting luminance information, color correction on the image data IMA and outputs the image data IMB after the correction. Specifically, the color correction circuit 120 multiplies pixel data of each pixel by a reciprocal number of luminance of light reaching the pixel and sets the obtained result as new pixel data. An image represented by the image data IMB is referred to as an output image.

The circuit device 100 transmits the image data IMB of the output image to the display driver 230 through an image interface (not illustrated). Examples of modes of the image interface may be various modes including an LVDS, a parallel RGB mode, and a display port.

The color correction circuit 120, the luminance analysis circuit 130, and the dimmer circuit 150 are logic circuits that process digital signals. Each of the color correction circuit 120, the luminance analysis circuit 130, and the dimmer circuit 150 may be configured by a separate logic circuit, or some or all of the above circuits may be configured by an integrated logic circuit. Alternatively, a processor such as a DSP may execute an instruction set or a program in which functions of the color correction circuit 120, the luminance analysis circuit 130, and the dimmer circuit 150 are described, thereby implementing the functions of these circuits. Alternatively, the circuit device 100 may be a processor such as a CPU, a GPU, a microcomputer, a DSP, an ASIC, or an FPGA. The processor may execute an instruction set or a program in which a function of each unit of the circuit device 100 is described, thereby implementing the function of the circuit device 100.

FIG. 5 illustrates a first example of weight setting according to the global dimming parameter. It is assumed that the value of the global dimming parameter DIMG is larger as the ambient light is brighter.

The dimmer circuit 150 determines whether the global dimming parameter DIMG is equal to or greater than a threshold th. The dimmer circuit 150 sets the attenuation degree of the weight W(r) to a first attenuation degree when the global dimming parameter DIMG is equal to or greater than the threshold th. The dimmer circuit 150 sets the attenuation degree of the weight W(r) to a second attenuation degree when the global dimming parameter DIMG is smaller than the threshold th. The second attenuation degree is higher than the first attenuation degree.

When the above-described first method is used, the dimmer circuit 150 uses a lookup table corresponding to the first attenuation degree or the second attenuation degree among the lookup tables which are the attenuation rate distribution information 171. Alternatively, when the second method is used, the dimmer circuit 150 sets the filter matrix of the lowpass filter to a filter matrix corresponding to the first attenuation degree or the second attenuation degree.

FIG. 6 illustrates a second example of weight setting according to the global dimming parameter.

The dimmer circuit 150 determines whether the global dimming parameter DIMG is equal to or greater than a threshold th. When the global dimming parameter DIMG is equal to or greater than the threshold th, the dimmer circuit 150 sets the local dimming control to a high-luminance mode and sets the attenuation degree of the weight W(r) to the attenuation degree corresponding to the high-luminance mode. When the global dimming parameter DIMG is smaller than the threshold th, the dimmer circuit 150 sets the local dimming control to a halo reduction mode and sets the attenuation degree of the weight W(r) to the attenuation degree corresponding to the halo reduction mode. The attenuation degree corresponding to the halo reduction mode is higher than the attenuation degree corresponding to the high-luminance mode.

When the above-described first method is used, the dimmer circuit 150 uses a lookup table corresponding to the high-luminance mode or the halo reduction mode among the lookup tables which are the attenuation rate distribution information 171. Alternatively, when the second method is used, the dimmer circuit 150 sets the filter matrix of the lowpass filter to a filter matrix corresponding to the high-luminance mode or the halo reduction mode.

The halo is a phenomenon in which light blurs into a dart portion around a bright portion in a high-contrast image. Since the light source element behind the bright portion emits light with high luminance, the light leaks from the surrounding dark portion, resulting in a halo. The halo reduction mode is a mode in which the halo reduction is emphasized in the balance between the display luminance and the halo reduction. The high-luminance mode is a mode in which the display luminance is emphasized in the balance between the display luminance and the halo reduction.

FIG. 7 illustrates a third example of weight setting according to the global dimming parameter.

The dimmer circuit 150 determines whether the global dimming parameter DIMG is equal to or greater than a threshold th1 and equal to or greater than a threshold th2. The threshold th1 is greater than the threshold th2. The dimmer circuit 150 sets the attenuation degree of the weight W(r) to a first attenuation degree when the global dimming parameter DIMG is equal to or greater than the threshold th1. The dimmer circuit 150 sets the attenuation degree of the weight W(r) to a second attenuation degree when the global dimming parameter DIMG is smaller than the threshold th2. The dimmer circuit 150 sets the attenuation degree of the weight W(r) to a third attenuation degree when the global dimming parameter DIMG is smaller than the threshold th1 and equal to or greater than the threshold th2. The third attenuation degree is higher than the first attenuation degree, and the second attenuation degree is higher than the third attenuation degree.

When the above-described first method is used, the dimmer circuit 150 uses a lookup table corresponding to the first attenuation degree, the second attenuation degree, or the third attenuation degree among the lookup tables which are the attenuation rate distribution information 171. Alternatively, when the second method is used, the dimmer circuit 150 sets the filter matrix of the lowpass filter to a filter matrix corresponding to the first attenuation degree, the second attenuation degree, or the third attenuation degree.

The weight setting according to the global dimming parameter is not limited to the first to third examples. For example, the attenuation degree of the weight W(r) may be set according to the global dimming parameter DIMG in more stages than in FIG. 7. Alternatively, the attenuation degree of the weight W(r) may be continuously set according to the global dimming parameter DIMG.

In the present embodiment, the circuit device 100 controls the display device 200 including the light source elements and the display panel 220. The circuit device 100 includes the luminance analysis circuit 130 and the dimmer circuit 150. The luminance analysis circuit 130 performs luminance analysis on the image data IMA of the input image to output the luminance information INT. The dimmer circuit 150 determines the light source luminance information indicating the light-emission luminance of the light emitted by each of the light source elements according to the luminance information INT. The dimmer circuit 150 determines the light-emission luminance of the light source element from the luminance information INT of the pixel by using the weight W(r) depending on the distance r between the pixel and the light source element. The dimmer circuit 150 sets the attenuation degree of the weight W(r) with respect to the distance r to the first attenuation degree when the global dimming parameter DIMG determined in the global dimming processing is a first value. The dimmer circuit 150 sets the attenuation degree to the second attenuation degree higher than the first attenuation degree when the global dimming parameter DIMG is a second value smaller than the first value.

The light-emission luminance of the light source elements arranged around the high-luminance pixel increases in the dimming processing under the local dimming control. According to the present embodiment, it is possible to control how far the light source element from the high-luminance pixel becomes bright by changing the attenuation degree of the weight W(r) depending on the distance r between the pixel and the light source element. Thus, it is possible to perform dimming optimal for display content, environment, or the like. Specifically, when the attenuation degree of the weight W(r) makes low in the case where the global dimming parameter DIMG is large, the light-emission luminance of the light source elements around the high-luminance pixel is more likely to increase. Thus, the image is displayed with high luminance when the environment is bright. On the other hand, when the attenuation degree of the weight W(r) makes high in the case where the global dimming parameter DIMG is small, the light-emission luminance of the light source elements far from the high-luminance pixel is less likely to increase. Thus, it is possible to reduce the halo that tends to stand out when the environment is dark.

In the example of FIG. 5 or 6, the first value of the global dimming parameter DIMG is a value belonging to DIMG≥th, and the second value is a value belonging to DIMG<th. In the example of FIG. 7, the first value is a value belonging to DIMG≥th1, and the second value is a value belonging to DIMG<th2.

In the present embodiment, when the global dimming parameter DIMG is the first value, the high-luminance mode may be set in which the display is made with higher luminance compared to the halo reduction mode. When the global dimming parameter DIMG is the second value, the halo reduction mode may be set in which the occurrence of halo is reduced compared to the high-luminance mode.

According to the present embodiment, the high-luminance mode can be set when the environment is bright, and the halo reduction mode can be set when the environment is dark. Specifically, when the global dimming parameter DIMG is the first value, the attenuation degree of the weight W(r) is set to the first attenuation degree, whereby the high-luminance mode is set. On the other hand, when the global dimming parameter DIMG is the second value smaller than the first value, the attenuation degree of the weight W(r) is set to the second attenuation degree higher than the first attenuation degree, whereby the halo reduction mode is set.

In the present embodiment, the dimmer circuit 150 may set the attenuation degree of the weight W(r) to the third attenuation degree when the global dimming parameter DIMG is a third value. The third value is between the first value and the second value. The third attenuation degree is between the first attenuation degree and the second attenuation degree.

According to the present embodiment, even the environment has intermediate brightness, it is possible to perform dimming optimal for display content, environment, or the like. Specifically, when the global dimming parameter DIMG is the third value between the first value and the second value, the attenuation degree of the weight W(r) is set to the third attenuation degree between the first attenuation degree and the second attenuation degree, whereby it is possible to realize an intermediate display mode between the high-luminance mode and the halo reduction mode.

In the example of FIG. 7, the third value is a value belonging to th1>DIMG≥th2.

In the present embodiment, the dimmer circuit 150 may determine the light source luminance information by performing the global dimming processing, based on the global dimming parameter DIMG, on the light-emission luminance of each of the light source elements determined according to the luminance information INT.

According to the present embodiment, the global dimming processing is performed on the light-emission luminance of each of the light source elements determined by the local dimming according to the global dimming parameter DIMG. Thus, it is possible to combine appropriate local dimming control according to the brightness of the environment and the global dimming processing. It is possible to control the brightness of the entire screen according to the brightness of the environment while improving the display quality such as halo reduction by the appropriate local dimming control according to the brightness of the environment.

3. Dimmer Circuit

A description will be made below with respect to a configuration example of the dimmer circuit and the color correction circuit in a case where the attenuation degree of the weight W(r) is set in the above-described first method, that is, in a case where the lookup tables are used as the attenuation rate distribution information.

Figure 8:
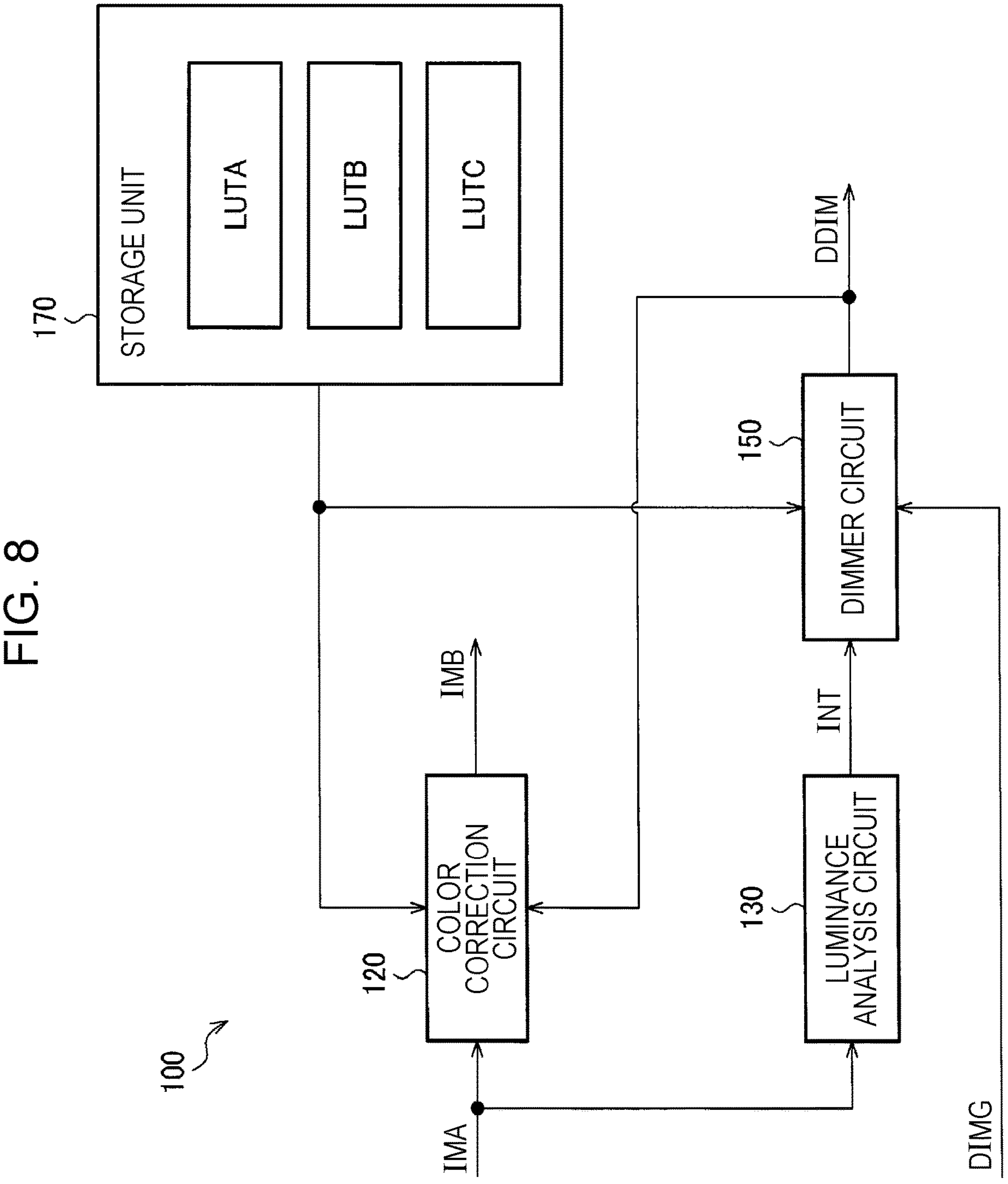
FIG. 8 is a diagram illustrating an example of a detailed configuration of the circuit device.

FIG. 8 illustrates a detailed configuration example of the circuit device. The same components as those described with reference to FIG. 2 will be appropriately omitted.

In the present configuration example, the storage unit 170 stores, as the attenuation rate distribution information 171, a lookup table indicating an attenuation rate distribution of light reaching the display panel from the light source element. FIG. 8 illustrates an example in which the storage unit 170 stores three types of lookup tables LUTA, LUTB, and LUTC having different attenuation rate distributions. However, it suffices that the number of lookup tables may be two or more.

The dimmer circuit 150 reads out the lookup table LUTA, the lookup table LUTB, or the lookup table LUTC from the storage unit 170 according to the global dimming parameter DIMG. The dimmer circuit 150 performs the dimming processing by using the luminance information INT and the lookup table read from the storage unit 170, thereby determining the light source luminance information indicating the light-emission luminance of each of the light source elements and outputting the light source luminance information as the light source luminance data DDIM.

The color correction circuit 120 reads out, from the storage unit 170, the lookup table used for computation of lighting luminance among the lookup tables LUTA, LUTB, and LUTC. A lookup table used for computation of lighting luminance may be prepared separately from the lookup tables LUTA, LUTB, and LUTC corresponding to the modes. The color correction circuit 120 computes luminance of light, which illuminates each pixel of the display panel 220, based on the light source luminance data DDIM and the lookup table read from the storage unit 170. The color correction circuit 120 multiplies pixel data of each pixel in the image data IMA by a reciprocal number of luminance of the light illuminating the pixel, and sets the obtained result as pixel data of the image data IMB.

The lookup tables LUTA, LUTB, and LUTC output, with respect to input distance information, attenuation rate information associated with the distance information. Examples will be described below in which the distance information is a square of the distance and the attenuation rate information is an attenuation rate expressed as a percentage, but the configuration is not limited thereto. The distance information may be a distance, the number of pixels, or the like. The attenuation rate information may be an attenuation rate expressed in any unit.

Figure 10:
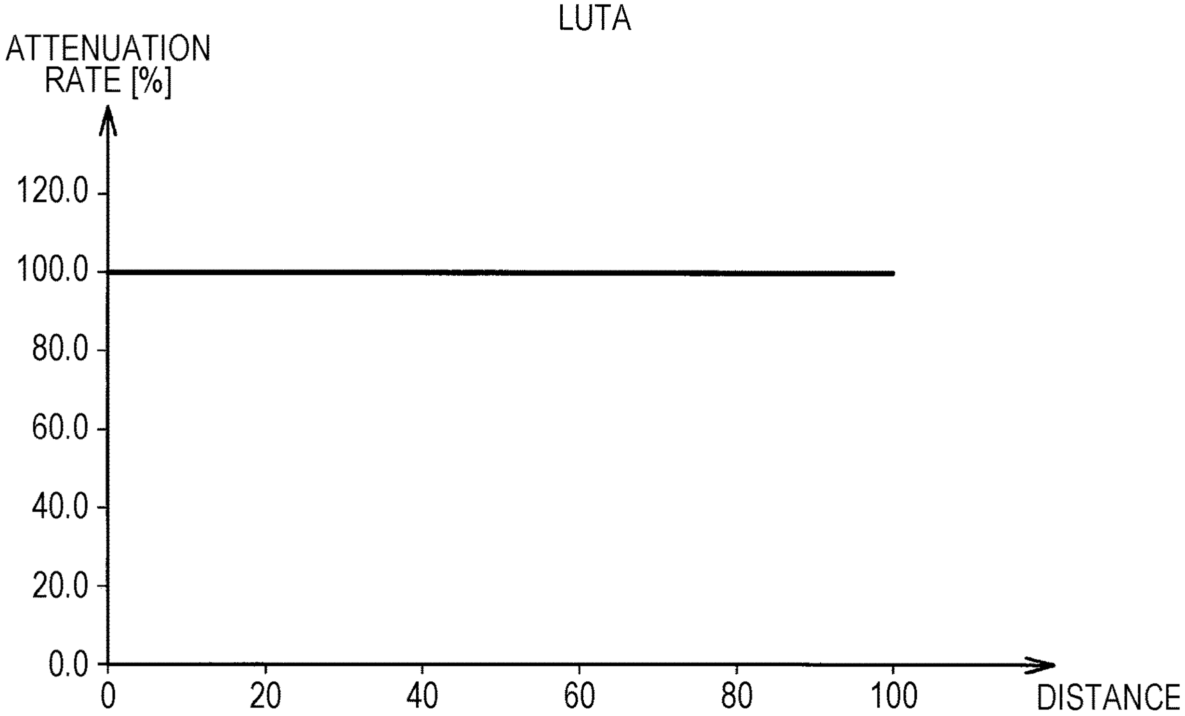
FIG. 10 is a diagram illustrating an example of an attenuation rate distribution of the lookup table LUTA.

FIG. 9 illustrates an example of the lookup table LUTA. The lookup table LUTA is a table of an attenuation rate distribution $lsf^0$, where the multiplier on a right shoulder of lsf means a power of lsf. FIG. 10 illustrates an example of an attenuation rate distribution of the lookup table LUTA.

The light from the light source element is diffused by a diffusion sheet or the like, and the diffused light irradiates the display panel. At this time, the luminance distribution of light due to diffusion is an attenuation rate distribution. However, the attenuation rate distribution used at the time of calculation of the light-emission luminance of the light source element does not necessarily be an actual attenuation rate distribution, and may be a virtual attenuation rate distribution programmed for calculation of the light-emission luminance. FIGS. 9 and 10 illustrate an example of an attenuation rate distribution with flat characteristics.

As illustrated in FIG. 9, the lookup table LUTA includes a lookup table LUTA1 in which squares of distances are stored and a lookup table LUTA2 in which attenuation rates are stored.

Each index of the lookup table LUTA1 stores the square of the distance associated with the index. An example is shown here in which the indexes are 0 to 10, but any number of indexes may be used. In addition, although an example is shown in which the distance is divided at equal intervals in a range of 0 to 100, the any range of the distance may be used, and the division does not necessarily be at equal intervals. The index is, for example, a memory address.

Each index of the lookup table LUTA2 stores an attenuation rate associated with the index. The attenuation rate is indicated by a value normalized with the maximum luminance as 100%. In the attenuation rate distribution $lsf^0$, the attenuation rates of all indexes are 100%.

For example, when the square of the distance is 300, the dimmer circuit 150 sequentially reads out the squares of the distances of the respective indexes from the lookup table LUTA1 and compares the squares with 300, thereby determining indexes 1 and 2 respectively corresponding to 100 and 400 having 300 therebetween. The dimmer circuit 150 reads out the attenuation rates 100% and 100% of the indexes 1 and 2 from the lookup table LUTA2 and obtains the attenuation rate corresponding to 300, which is the square of the distance, by interpolation. Since the distribution characteristics are flat here, the attenuation rate after interpolation is 100%.

Figure 12:
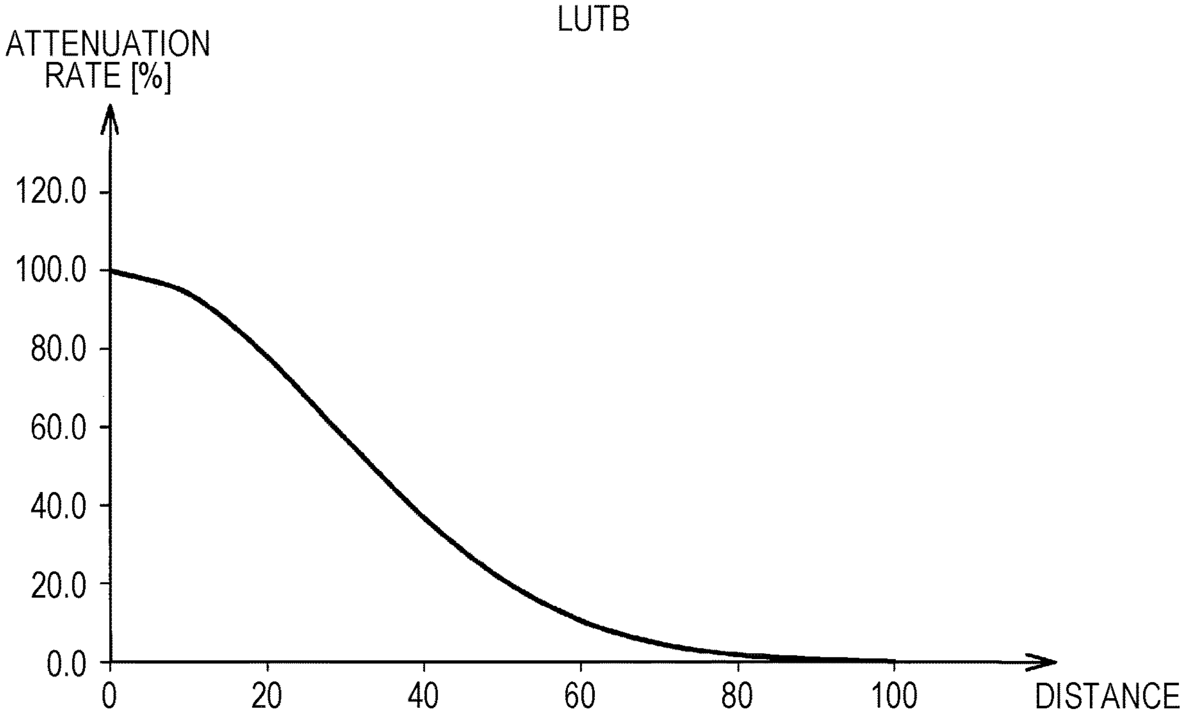
FIG. 12 is a diagram illustrating an example of an attenuation rate distribution of the lookup table LUTB.

FIG. 11 illustrates an example of the lookup table LUTB. The lookup table LUTB is a table of an attenuation rate distribution $lsf^1$. FIG. 12 illustrates an example of an attenuation rate distribution of the lookup table LUTB. The attenuation rate distribution $lsf^1$ is, for example, an actual attenuation rate distribution or an attenuation rate distribution approximated thereto, but may be a virtual attenuation rate distribution programmed for calculation of the light source luminance. FIGS. 11 and 12 illustrate an example in which the attenuation rate distribution $lsf^1$ is a Gaussian distribution.

As illustrated in FIG. 11, the lookup table LUTB includes a lookup table LUTB1 in which squares of distances are stored and a lookup table LUTB2 in which attenuation rates are stored. The contents and the reference method of the lookup table are the same as those of the lookup table LUTA.

Figure 14:
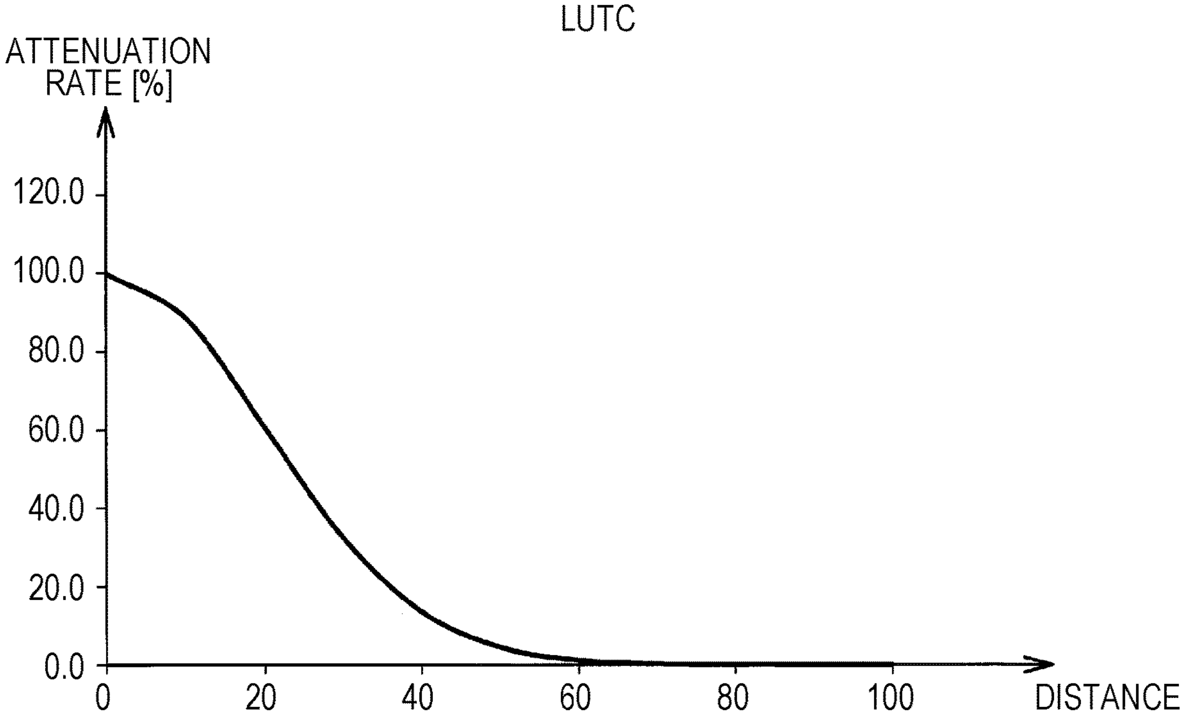
FIG. 14 is a diagram illustrating an example of an attenuation rate distribution of the lookup table LUTC.

FIG. 13 illustrates an example of the lookup table LUTC. The lookup table LUTC is a table of an attenuation rate distribution $lsf^2$. FIG. 14 illustrates an example of an attenuation rate distribution of the lookup table LUTC. The attenuation rate distribution $lsf^2$ is, for example, a distribution obtained by squaring the actual attenuation rate distribution, and is a virtual attenuation rate distribution. However, the attenuation rate distribution $lsf^2$ is not limited to the distribution obtained by squaring the actual attenuation rate distribution and may be any distribution programmed.

As illustrated in FIG. 13, the lookup table LUTC includes a lookup table LUTC1 in which squares of distances are stored and a lookup table LUTC2 in which attenuation rates are stored. The contents and the reference method of the lookup table are the same as those of the lookup table LUTA.

The attenuation rate distribution of the lookup table LUTB has a higher attenuation degree with respect to the distance than the attenuation rate distribution of the lookup table LUTA. The attenuation rate distribution of the lookup table LUTC has a higher attenuation degree with respect to the distance than the attenuation rate distribution of the lookup table LUTB. Regarding the attenuation rate distribution, "the attenuation degree with respect to the distance is high" means that the distance at which the attenuation rate decreases to a predetermined attenuation rate is short. The predetermined attenuation rate may be any rate, and is, for example, an attenuation rate within a range of 50% to 0%. Alternatively, "the attenuation degree with respect to the distance is high" means that the decrease width of the attenuation rate is large with respect to the distance change in the direction in which the distance increases. Alternatively, "the attenuation degree with respect to the distance is high" means that the spread of the light represented by the attenuation rate distribution is relatively narrow. FIGS. 9 to 14 illustrate the attenuation rate distribution that changes smoothly with respect to the distance, but the attenuation rate distribution may change stepwise with respect to the distance. FIGS. 9 to 14 illustrate one-dimensional lookup tables, but tow-dimensional lookup tables may be used.

Figure 15:
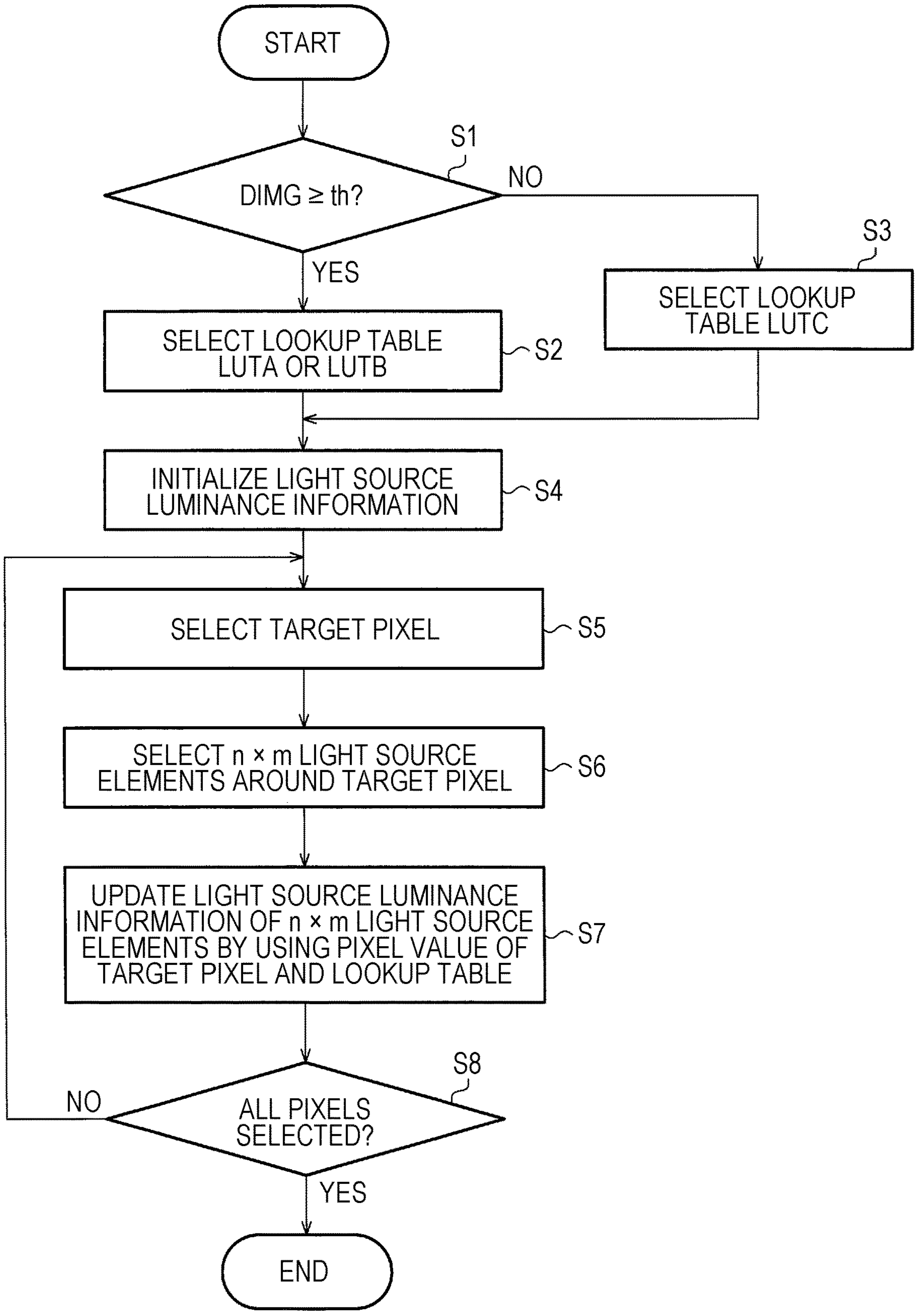
FIG. 15 is a flowchart of processing performed by the dimmer circuit.

FIG. 15 is a flowchart of processing performed by the dimmer circuit. In the following description, an example will be described in which the halo reduction mode and the high-luminance mode are switched according to the global dimming parameter DIMG. However, the mode may be switched in more steps according to the global dimming parameter DIMG, or the mode may be continuously switched.

In step S1, the dimmer circuit 150 determines whether the global dimming parameter DIMG is equal to or greater than the threshold th. When the global dimming parameter DIMG is equal to or greater than the threshold th, the dimmer circuit 150 sets the high-luminance mode and selects the lookup table LUTA or LUTB in step S2. When the global dimming parameter DIMG is not equal to or greater than the threshold th, the dimmer circuit 150 sets the halo reduction mode and selects the lookup table LUTC in step S3.

In step S4, the dimmer circuit 150 initializes the light source luminance information. For example, the luminance values of all of the light source elements are initialized to zero.

In step S5, the dimmer circuit 150 selects one pixel from the pixels in the luminance information INT. The selected pixel is referred to as a target pixel. Through a loop from step S5 to step S8, target pixels are sequentially selected. For example, a process is performed in which a first pixel of a first scanning line of the image data IMA is selected in the first round of step S5, and a second pixel, a third pixel, and the like are sequentially selected in the next and following rounds of step S5, and pixels of a second scanning line are sequentially selected when all the pixels of the first scanning line are selected, and such a process is repeated up to a final scanning line.

In step S6, the dimmer circuit 150 selects n×m light source elements around the target pixel. The n×m light source elements are also referred to as surrounding light source elements. FIG. 4 described above illustrates an example of n=m=4. The dimmer circuit 150 selects light source elements L1 to L16 in the nearest two columns in each of a +x-direction and a −x-direction and in the nearest two rows in each of the +y-direction and the −y-direction with respect to the position (i, j) of the target pixel 22. When k is an integer of 1 or more and 16 or less, a position of a light source element Lk is represented as (xk, yk).

In step S7, using the pixel value of the target pixel 22 in the image data IMA and the lookup table selected in step S2 or S3, the light source luminance information is updated for each of the n×m light source elements selected in step S6.

In step S8, the dimmer circuit 150 determines whether all of the pixels have been selected as the target pixels, the process ends when all of the pixels have been selected, and the process returns to step S5 when there is any pixel that has not been selected.

A description will be made with respect to update processing of the light source luminance information in step S7 using the example of FIG. 4. In the following description, it is assumed that the number of pixels of the luminance information INT is equal to the number of pixels of the display panel 220. The dimmer circuit 150 obtains, from Formulae (1) and (2) below, a required variation amount $\Delta_{ij}$ indicating a variation amount required for the amount of light received by the target pixel 22 from the light source elements L1 to L16.

$$\Delta_{ij} = INT_{ij} - \sum_{k=1}^{16} lsf(k) \times powc(k) \tag{1}$$

$$lsf(k) = lsf\left((i - xk)^2 + (j - yk)^2\right) \tag{2}$$

In Formula (1) above, $INT_{ij}$ indicates a luminance value of the target pixel 22 in the luminance information INT. As indicated in Formula (2) above, lsf(k) indicates an attenuation rate of the light with which the light source element Lk illuminates the target pixel 22. Although the square of the distance is used as an argument in Formula (2) above, the distance may be used as an argument. The dimmer circuit 150 obtains the lsf(k) by using the lookup table LUTB. In Formula (1), powc(k) indicates previous light source luminance information of the light source element Lk. The previous light source luminance information is light source luminance information calculated using a previous target pixel selected immediately before the current target pixel 22. The previous target pixel is a pixel at a position (i−1, j) immediately before the position (i, j) in the x-direction.

The dimmer circuit 150 updates the light source luminance information by distributing the required variation amount $\Delta_{ij}$ to the light source luminance information of the light source element Lk by using Formulae (3) and (4) below. In the right side of Formula (3) below, since the denominator of a second term when $\Delta_{ij}>0$ is common regardless of k, the required variation amount $\Delta_{ij}$ is weighted by $lsf^x(k)$, where $lsf^x(k)$ is attenuation rate distribution information selected according to the mode. In the flow of FIG. 15, for example, x=0 or 1 is selected in the high-luminance mode, and x=2 is selected in the halo reduction mode. Since the attenuation rate distribution attenuates faster as x becomes larger, the required variation amount $\Delta_{ij}$ is more likely to be distributed to the light source element close to the target pixel 22, and the required variation amount $\Delta_{ij}$ is less likely to be distributed to the light source element far from the target pixel 22. Thus, the light source luminance of the light source element far from the high-luminance pixel is less likely to increase, and the halo reduction effect is obtained.

$$powu(k) = \begin{cases} powc(k) + \Delta_{ij} \dfrac{lsf^x(k)}{\sum_{\alpha=1}^{16} lsf^{x+1}(\alpha)}, & \text{if } \Delta_{ij} > 0 \\ powc(k), & \text{if } \Delta_{ij} \le 0 \end{cases} \tag{3}$$

$$lsf^x(k) = lsf^x\left((i - xk)^2 + (j - yk)^2\right) \tag{4}$$

In Formula (3) above, powu(k) indicates the current light source luminance information, that is, the light source luminance information after being updated. As indicated in Formula (4) above, $lsf^x(k)$ indicates an attenuation rate of the light with which the light source element Lk illuminates the target pixel 22. Although the square of the distance is used as an argument in Formula (4) above, the distance may be used as an argument, where x is an integer of 0 or more. In the examples of FIGS. 9 to 14, x=0, 1, and 2. In other words, the dimmer circuit 150 obtains $lsf^0(k)$ by referring to the lookup table LUTA when x=0, obtains $lsf^1(k)$ by referring to the lookup table LUTB when x=1, and obtains $lsf^2(k)$ by referring to the lookup table LUTC when x=2.

In the present embodiment, the storage unit 170 may store pieces of attenuation rate distribution information indicating the attenuation rate distribution of the light with respect to the distance when the light source element illuminates the pixel. When the global dimming parameter DIMG is the first value, the dimmer circuit 150 may set the weight W(r) based on first attenuation rate distribution information among the pieces of attenuation rate distribution information. When the global dimming parameter DIMG is the second value, the dimmer circuit 150 may set the weight W(r) based on second attenuation rate distribution information, which has an attenuation rate distribution different from that of the first attenuation rate distribution information, among the pieces of attenuation rate distribution information.

According to the present embodiment, it is possible to set the attenuation degree of the weight W(r) by selecting the attenuation rate distribution information according to the global dimming parameter DIMG from the pieces of attenuation rate distribution information having different attenuation rate distributions from each other.

In the examples of FIGS. 8 to 15, the pieces of attenuation rate distribution information correspond to the lookup tables LUTA, LUTB, and LUTC. In the flow example of FIG. 15, the first attenuation rate distribution information corresponds to the lookup table LUTA or LUTB, and the second attenuation rate distribution information corresponds to the lookup table LUTC. Further, the weight W(r) corresponds to a coefficient of the required variation amount $\Delta_{ij}$ in the right side of Formula (3) above. The coefficient includes $lsf^x(k)$ indicating the attenuation rate distribution information. In other words, the weight W(r) is set based on the attenuation rate distribution information.

In the present embodiment, the attenuation rate distribution of the second attenuation rate distribution information has a higher attenuation degree of light with respect to the distance than the attenuation rate distribution of the first attenuation rate distribution information.

It is possible to make the attenuation degree of the weight W(r) high by performing the local dimming using the attenuation rate distribution information in which the attenuation degree of light with respect to the distance is high. In other words, when the global dimming parameter DIMG is the second value smaller than the first value, the attenuation degree of the weight W(r) is set to the second attenuation degree higher than the first attenuation degree.

4. Color Correction Circuit

Figure 16:
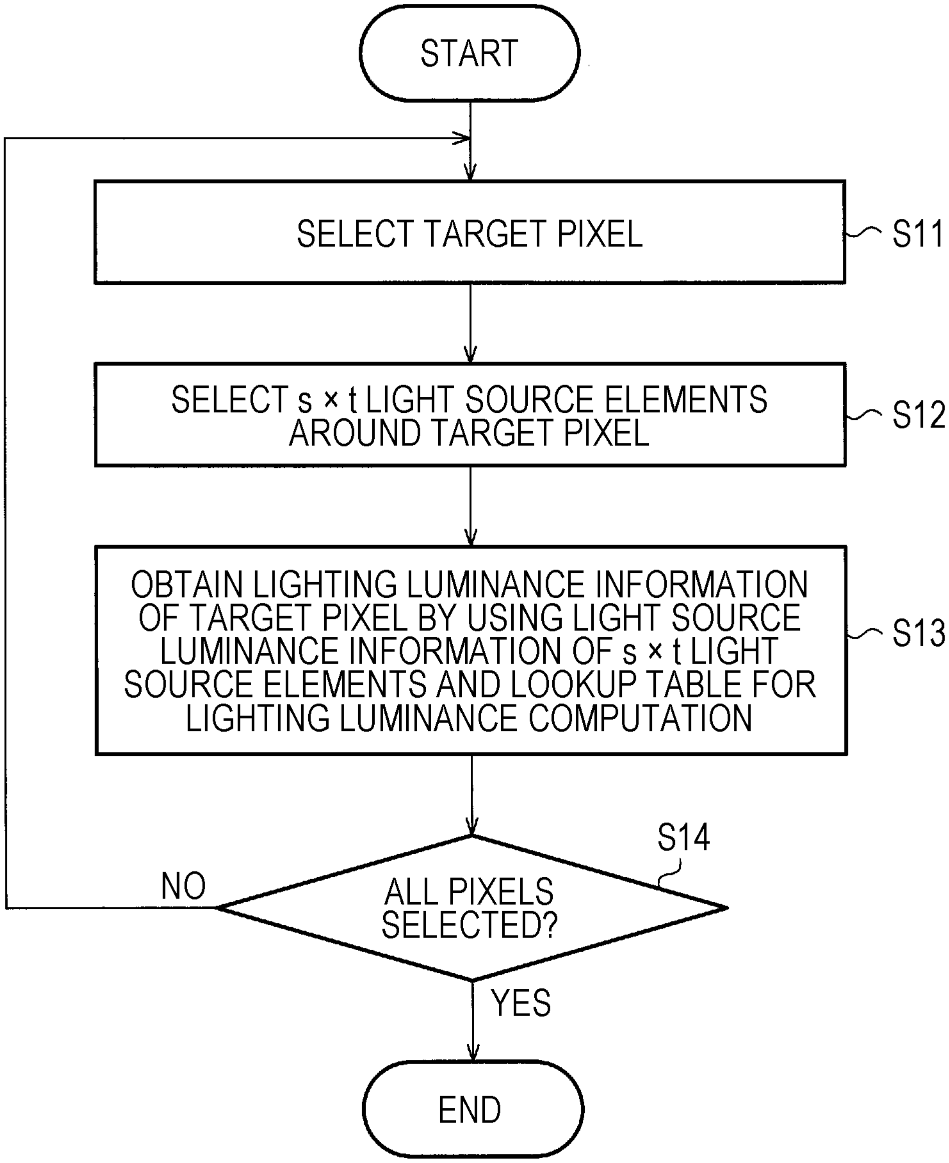
FIG. 16 is a flowchart of lighting luminance computation processing performed by a color correction circuit.

FIG. 16 is a flowchart of lighting luminance computation processing performed by the color correction circuit.

In step S11, the color correction circuit 120 selects one pixel from the pixels in the image data IMA. The selected pixel is referred to as a target pixel. Through a loop from step S11 to step S14, target pixels are sequentially selected. For example, a process is performed in which a first pixel of a first scanning line of the image data IMA is selected in the first round of step S11, a second pixel, a third pixel, and the like are sequentially selected in the next and following rounds of step S11, and pixels of a second scanning line are sequentially selected when all the pixels of the first scanning line are selected, and such a process is repeated up to a final scanning line.

In step S12, the color correction circuit 120 selects s×t light source elements around the target pixel, where each of s and t may be an integer of 2 or more. The number of s×t light source elements may be the same as or different from the number of n×m light source elements in FIG. 4. In addition, the lighting luminance information may be obtained from all of the light source elements instead of the s×t light source elements.

In step S13, the color correction circuit 120 obtains the lighting luminance information of the target pixel by using the light source luminance information of the selected s×t light source elements and the lookup table for lighting luminance computation. Specifically, the color correction circuit 120 obtains the lighting luminance information of the target pixel by using Formula (5) below.

$$PL(i,j) = \sum_{\beta=1}^{s \times t} pow(\beta) \times lsf(\beta) \tag{5}$$

In Formula (5) above, PL(i, j) indicates the lighting luminance information for the pixel at the position (i, j), and pow (B) indicates the light source luminance information determined by the dimmer circuit 150. In other words, after the loop of steps S5 to S8 in FIG. 15 is executed up to the last pixel in the luminance information INT, the powu in Formula (3) above is used as pow in Formula (5) above. Even when the loop of steps S5 to S8 is not executed up to the last pixel in the luminance information INT, the updating of the light source luminance information of the light source elements sequentially ends as the target pixel advances, and thus the light source luminance information for which the updating ends may be used as pow. The color correction circuit 120 obtains lsf(B) by using the lookup table LUTB.

In step S14, the color correction circuit 120 determines whether all of the pixels have been selected as the target pixels, the process ends when all of the pixels have been selected, and the process returns to step S11 when there is any pixel that has not been selected.

Although the present embodiment has been described in detail above, it will be easily understood by those skilled in the art that various modifications can be made without substantially departing from the novel matters and effects of the present disclosure. Therefore, all such modifications are included in the scope of the present disclosure. For example, the terms described together with different terms having a broader meaning or the same meaning at least once in the specification or the drawings can be replaced with the different terms in any part in the specification or the drawings. Further, all combinations of the present embodiment and the modifications may be within the scope of the present disclosure. Furthermore, the configuration, the operation, and the like of the circuit device, the backlight, the display device, the display system, the processing device, the electronic apparatus, and the like are not limited to those described in the present embodiment, and various modifications can be implemented.

What is claimed is:

1. A circuit device that controls a display device including light source elements and a display panel, the circuit device comprising:

a luminance analysis circuit configured to perform luminance analysis on image data of an input image to output luminance information;

a dimmer circuit configured to determine light source luminance information indicating light-emission luminance of each of the light source elements according to the luminance information; and a memory configured to store pieces of attenuation rate distribution information each indicating an attenuation rate distribution of light with respect to a distance between a pixel and one of the light source elements when the one of the light source elements illuminates the pixel, wherein the dimmer circuit is further configured to:

determine the light-emission luminance of the light source element from the luminance information of the pixel by using a weight corresponding to the distance;

set an attenuation degree of the weight with respect to the distance to a first attenuation degree when a global dimming parameter determined by a global dimming processing is a first value;

set the attenuation degree to a second attenuation degree higher than the first attenuation degree when the global dimming parameter is a second value smaller than the first value;

set the weight based on first attenuation rate distribution information out of the pieces of attenuation rate distribution information when the global dimming parameter is the first value; and sets the weight based on second attenuation rate distribution information which has the attenuation rate distribution different from the attenuation rate distribution of the first attenuation rate distribution information, out of the pieces of attenuation rate distribution information when the global dimming parameter is the second value.

2. The circuit device according to claim 1, wherein the attenuation rate distribution of the second attenuation rate distribution information has a higher attenuation degree of light with respect to the distance than the attenuation rate distribution of the first attenuation rate distribution information.

3. The circuit device according to claim 1, wherein when the global dimming parameter is the first value, a high-luminance mode is set in which a display is made with higher luminance compared to a halo reduction mode, and when the global dimming parameter is the second value, the halo reduction mode is set in which an occurrence of a halo is reduced compared to the high-luminance mode.

4. The circuit device according to claim 1, wherein the dimmer circuit is further configured to determine the light source luminance information by performing the global dimming processing based on the global dimming parameter on the light-emission luminance of each of the light source elements determined according to the luminance information.

5. The circuit device according to claim 1, further comprising a color correction circuit configured to perform color correction on the image data based on the light source luminance information.

6. The circuit device according to claim 1, wherein the global dimming parameter is a parameter that is set to a larger value as an environment is brighter or luminance of the input image is higher.

7. A display system comprising:

the circuit device according to claim 1; and the display device.

8. A circuit device that controls a display device including light source elements and a display panel, the circuit device comprising:

a luminance analysis circuit configured to perform luminance analysis on image data of an input image to output luminance information; and a dimmer circuit configured to determine light source luminance information indicating light-emission luminance of each of the light source elements according to the luminance information, wherein the dimmer circuit is further configured to:

determine the light-emission luminance of the light source element from the luminance information of a pixel by using a weight corresponding to a distance between the pixel and one of the light source elements;

set an attenuation degree of the weight with respect to the distance to a first attenuation degree when a global dimming parameter determined by a global dimming processing is a first value;

set the attenuation degree to a second attenuation degree higher than the first attenuation degree when the global dimming parameter is a second value smaller than the first value; and set the attenuation degree to a third attenuation degree between the first attenuation degree and the second attenuation degree when the global dimming parameter is a third value between the first value and the second value.

9. A circuit device that controls a display device including light source elements and a display panel, the circuit device comprising:

a luminance analysis circuit configured to perform luminance analysis on image data of an input image to output luminance information; and a dimmer circuit configured to determine light source luminance information indicating light-emission luminance of each of the light source elements according to the luminance information, wherein the dimmer circuit is further configured to:

determine the light-emission luminance of each of the light source elements by using a weight corresponding to a distance between each of the light source elements and a corresponding pixel of a plurality of pixels of the display panel;

set an attenuation degree of the weight with respect to the distance to a first attenuation degree when a global dimming parameter determined by a global dimming processing is a first value;

set the attenuation degree to a second attenuation degree higher than the first attenuation degree when the global dimming parameter is a second value smaller than the first value;

multiply the light-emission luminance of each of the light source elements by the global dimming parameter and by using the weight to determine the light source luminance information; and output light source luminance data corresponding to the light source luminance information to a light source driver.

* * * * *